United States Patent [19]
Ritter, Jr. et al.

[11] 3,881,906
[45] May 6, 1975

[54] HEAT TREATING GLASS SHEETS
[75] Inventors: George F. Ritter, Jr., Toledo; Frank J. Hymore, Oregon; Donald D. Rahrig, Toledo, all of Ohio
[73] Assignee: Libbey-Owens-Ford Company, Toledo, Ohio
[22] Filed: Aug. 20, 1973
[21] Appl. No.: 390,110

[52] U.S. Cl. .................. 65/104; 65/106; 65/114; 65/118; 65/349
[51] Int. Cl. ............................................. C03b 27/00
[58] Field of Search ............ 65/104, 106, 107, 348, 65/349, 351, 182 A, 114, 117, 118, 119, 196, 101, 245; 29/126, 127

[56] References Cited
UNITED STATES PATENTS
| | | | |
|---|---|---|---|
| 1,818,152 | 8/1931 | Nobbe | 65/101 |
| 2,924,695 | 2/1960 | Atkeson | 65/114 X |
| 3,545,951 | 12/1970 | Nedelec | 65/107 X |
| 3,672,861 | 6/1972 | Ritter, Jr. et al. | 65/114 X |
| 3,734,706 | 5/1973 | Ritter, Jr. | 65/106 X |

*Primary Examiner*—Arthur D. Kellogg
*Attorney, Agent, or Firm*—Collins, Oberlin & Darr

[57] ABSTRACT

A method of and apparatus for bending and tempering thin glass sheets while supported horizontally and conveyed along a predetermined path, which involves moving the sheets after they have been heated to bending temperature over contoured rolls to preliminarily bend the glass, then into position above a bending mold where they are bent to the desired final curvature, thereafter supporting the bent sheets and moving them into the tempering section on rolls that fit their bent contour, initially chilling the bent sheets in the tempering section with blasts of air directed toward their surfaces and angled in the direction of sheet travel and subsequently with air directed thereagainst from trap-free surfaces.

11 Claims, 9 Drawing Figures

0
HEAT TREATING GLASS SHEETS

BACKGROUND OF THE INVENTION

1. Field of the Invention

The present invention relates broadly to the heat treating of glass, and more particularly to an improved method of and apparatus for producing thin, bent, tempered glass sheets.

2. Description of the Prior Art

Bent glass is widely used in glazing sight openings in vehicles such as automobiles or the like and, to be suitable for such application, flat glass sheets or plates must be bent to precisely defined curvatures dictated by the overall styling of the vehicles and the manner of mounting the glass in the opening. At the same time it is important that the bent sheets meet stringent optical requirements and that the viewing area of the window or light be free of optical defects that would tend to interfere with the clear viewing of objects through it. Further, bent glass sheets intended for use as glazing closures in vehicles are subjected to an additional heat treatment to either anneal or temper the glass, thereby further altering its physical characteristics.

In general, therefore, the commercial production of bent glass sheets for such purposes commonly includes heating flat sheets to the softening point of the glass, bending the heated sheets to a desired curvature and thereafter cooling the bent sheets in a controlled manner to a temperature below the annealing range of the glass.

For reasons of efficiency and to permit their being handled in large quantities, the sheets are usually heated, bent and cooled while being moved almost continuously along a fixed path and successively through a heating area, a bending area and a cooling area, which permits heat imparted to the sheet to bring it to proper bending temperature to also be utilized in the final heat treating process.

Within the last several years considerable emphasis has been placed on the use of thinner and thinner glass sheets for automotive glazing purposes. This has created problems in bending and tempering, due to the lesser ability of the thinner sheets to retain heat, and has necessitated certain revisions in bending and chilling techniques as evidenced by the disclosures in U.S. Pat. Nos. 3,476,540 and 3,454,389.

SUMMARY OF THE INVENTION

It is a primary object of this invention to provide a still further improved method and apparatus for shaping and heat treating glass sheets, and one that is especially well adapted to the production of thin sheets of bent tempered glass.

Another object is the provision in such a method and apparatus of means for preliminarily bending a glass sheet toward its ultimately desired curvature immediately after heating and while it is moving toward the area in which bending to the finished shape takes place.

Another object is the provision of closely adjacent but definitely separated areas in which the bending and tempering steps of the method are performed.

Another object is to provide substantially transversely continuous line support for the surface areas of the bent sheets until after tempering is begun.

Another object is to direct blasts of air, toward the bent and heated sheets moving into the tempering area, that are angled in the direction of sheet travel and act to assist forward movement of the glass sheets.

Still another object is the provision of means for directing blasts of air towards the glass sheets in the tempering area that are free of areas in which broken glass can be trapped.

Further objects and advantages of the invention will become apparent during the course of the following description, when taken in connection with the accompanying drawings.

BRIEF DESCRIPTION OF THE DRAWINGS

In the drawings, wherein like numerals are employed to designate like parts throughout.

DESCRIPTION OF THE PREFERRED EMBODIMENTS

Figure 1:
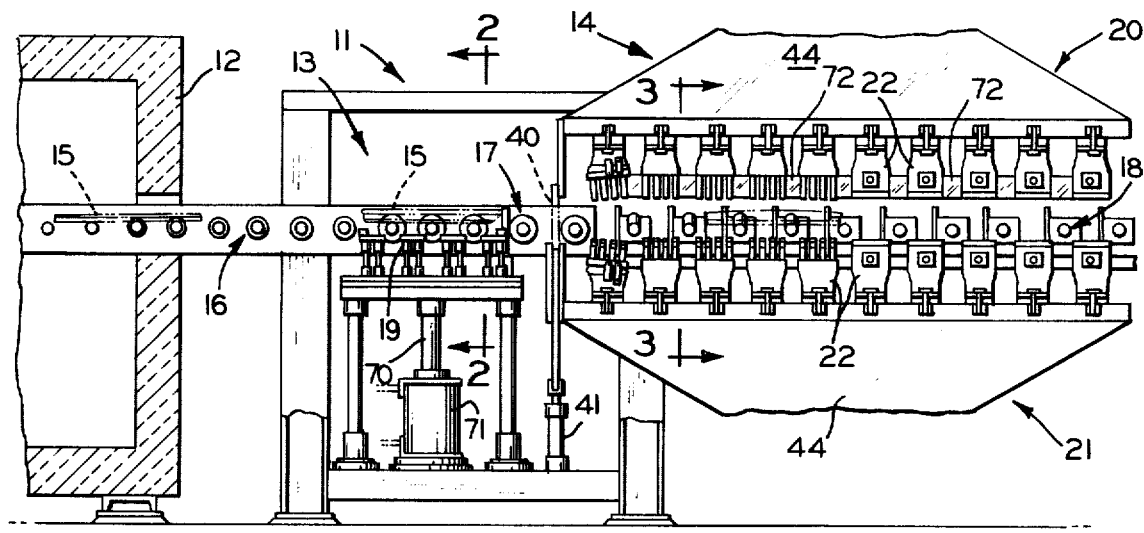
FIG. 1 is a longitudinal, vertical, sectional view through the heating, bending, and chilling areas of a preferred form of the apparatus of the invention.

Referring now more particularly to the drawings, there is illustrated in FIG. 1 a glass sheet bending and tempering apparatus, indicated generally by the numeral 11, which comprises a horizontally aligned heating furnace 12, bending area 13, and chilling or tempering area 14; and glass sheets 15 to be processed are supported for movement through the apparatus upon successive series of rolls 16, 17 and 18.

The series of rolls 16 support glass sheets 15 in the horizontal plane and during movement through the heating furnace 12 and up to the bending area 13. The rolls of the series 17 receive the glass sheets from the rolls 16, support them horizontally within the bending area 13 above the bending mold 19, both before and after bending, and convey them up to the tempering area 14, where they are received upon the rolls of the series 18 and carried thereby between opposed blast heads 20 and 21.

Figure 2:
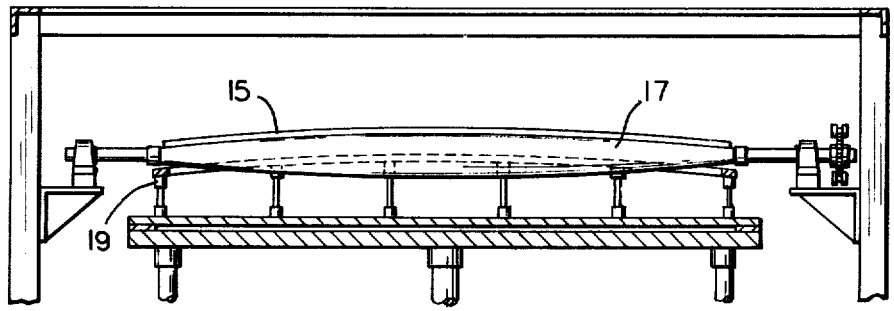
FIG. 2 is a transverse, vertical sectional view through the bending area taken substantially along the line 2—2 in FIG. 1.

Because the rolls of the series 17 must support the glass sheets after bending they are preferably, as shown in FIG. 2, shaped to fit the finished curvature to which the sheets are bent on the mold 19. In other words the rolls 17, which are located within the ring of the outline type mold 19 and between the mold and the blast heads 20 and 21, are contoured in a manner to insure their effectively supporting the hot glass after bending to an extent sufficient to prevent its collapsing or sagging out of its desired bent shape before it reaches the chilling area.

On the other hand the rolls of the series 16, because they receive flat glass sheets as they are introduced into the heating furnace 12, will of course be straight cylindrical rolls in the entrance or "cold" end of the furnace. Preferably, however, beginning in the furnace area where the glass sheets attain, or begin to attain bending temperature, successive rolls of the series 16 may be progressively contoured from the straight cylindrical shape in the cold end toward the shape of the rolls in the series 17 which conform to that of the finished bent glass sheets 15.

As a result, the heated glass sheets moving thereover and in contact therewith are progressively preformed or preliminarily bent during their movement through and out of the "hot" end of the furnace 12 so that, by the time they reach bending position above the mold 19, they will have attained a partially bent shape that conforms generally to that of the mold and of the desired finished bend. Among the advantages of such prebending is the reduction in the time that one part of the sheet remains in contact with the support rolls 17 while another part is being lifted therefrom during bending, and in the saving of wear and tear on the mold by shortening the length of the flat glass to a chordal dimension which more nearly matches that of the curvature of the mold, with a corresponding improvement in glass quality. To further protect the glass surface, at least the contoured rolls in the series 16 and 17 may be covered with fiber glass.

The rolls of the series 18 are also designed, at least in the entry part of the chilling area, to support the newly bent sheets as fully as do the rolls in the series 17. Moreover they are of a special construction that permits them to have quite small diameters. These two features are of particular importance in the chilling or tempering area when processing thin glass because it is more necessary to maintain the bent contour, and to locate the individual sections 22 of the blast heads 20 and 21, much closer together than when treating thicker glass.

Accordingly the rolls 18 are preferably of the spring type (FIGS. 3 and 4) made up from large diameter, for example ⅜ inch, wire wound to an outside coil diameter of 1⅛ inches. This of course leaves an inside diameter of only ⅜ inch, restricting the stub 23 over which the wire is threaded (FIG. 4) to a ⅜ inch diameter. Ordinarily, such a construction would not be strong enough to stand up in production line use but, by pushing the ends of the wound spring 24 into the sockets 25 of rigid cylindrical end portions 26 which carry outwardly extending shafts 27 that serve as support or drive shafts for the rolls, adequate strength is provided.

Thus, the shafts 27 at either end of the rolls in the series 18 are journaled in bearings 28 which are pivotally mounted, by means of pins 29 extending therefrom through vertical slots 30, in bearing brackets 31 carried at opposite sides of the blast heads 21 on suitable mounting structures 32. To assist in guiding pivotal movement of the bearings 28, pins 33, extend through the vertical slots 30 and arcuate slots 34 in extensions 35 from the top of the bearings 28. The pins 29 and 33 are threaded at their outer ends and provided with lock nuts or the like to retain the bearings 28 in fixed, adjusted position within the brackets 31. Like the rolls of the series 16 and 17, the rolls of the series 18 are provided with protective coverings of fiberglass or other non-scratching material in the form of sleeves 36 secured to the end portions 26 by collars 37 (FIG. 4).

Figure 3:
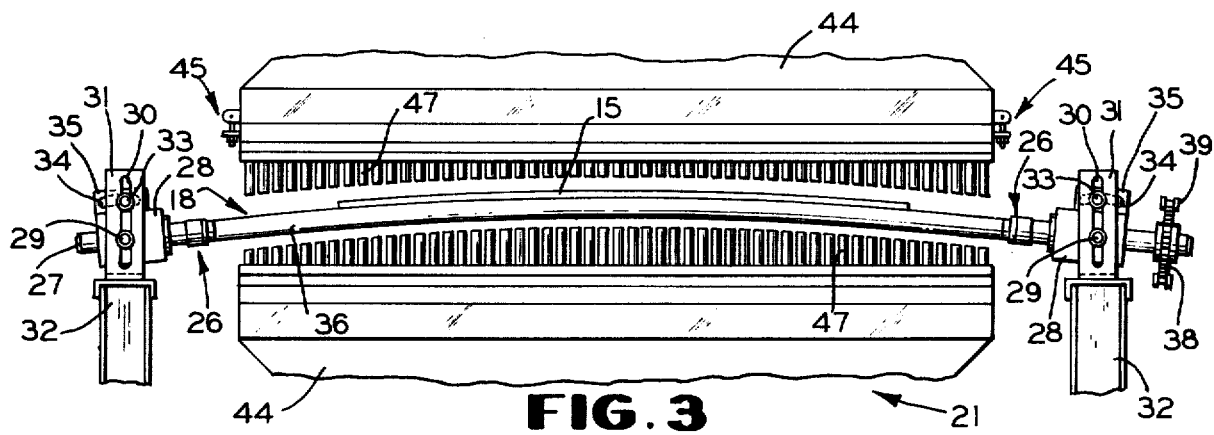
FIG. 3 is a transverse, vertical sectional view through the heat treating or tempering area taken substantially along the line 3—3 in FIG. 1.

The shaft 27 at one end of each of the series 18 rolls extends outwardly beyond its respective bearing 28 and carries a sprocket 38 which is driven by a chain 39 from a suitable source to power the rolls; while the shaft 27 at the opposite end is slidable in its bearing to permit arching of the roll as shown in FIG. 3 and adjustment of the degree of arching by pivotal movement of the bearings 28. In this connection, it will be understood that the rolls of the series 18 can be arched downwardly as well as upwardly to present either a convex or a concave surface to the glass depending on the contour to which the glass sheets are being bent and that it is necessary to support during chilling.

Figure 4:
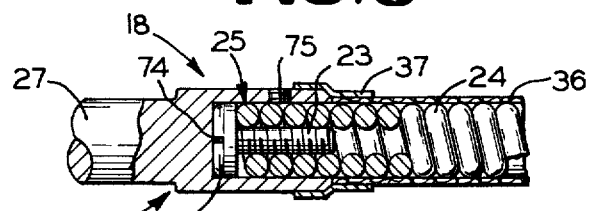
FIG. 4 is a sectional detail view through the attaching portion of the length of the spring type roll shown in FIG. 3.

Also, the rolls in the series 16 and 17 can be of the spring type shown in FIGS. 3 and 4 as well as of the shaped form shown in FIGS. 1 and 2; and, where the spring type is employed for the rolls of the series 16, their bearings can be pivoted and secured in the manner above described to provide the progressively increased arching in successive rolls from the cooler toward the hotter end of the furnace that is desired to prebend the glass sheets toward their desired finished bent contour.

As already explained, the rolls of the series 18 convey the bent glass sheets 15 through the chilling or tempering area 14 where they are rapidly chilled by blasts or jets of air directed toward opposite surfaces thereof from the individual sections 22 of the upper and lower blast heads 20 and 21 respectively; and, to prevent so called "blow-back" of high pressure air from the chilling area into the area of the mold when bending thin glass, a retractable gate 40 is located between the bending area 13 and the tempering area 14. The gate 40 is movable vertically, between its open position shown in full lines and its closed position shown in dotted lines in FIG. 1, by air cyclinders 41 which are automatically actuated to open the gate just prior to a glass sheet beginning to move out of the bending area, and to close the gate immediately after the glass sheet has left the area.

Figure 5:
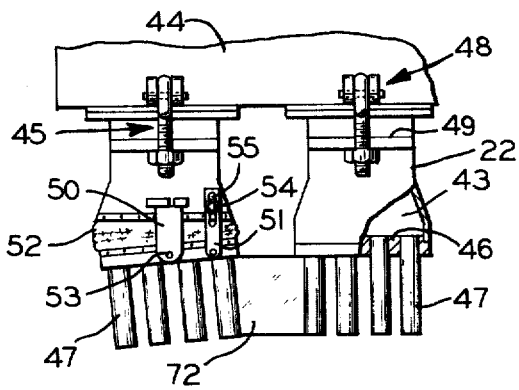
FIG. 5 is a detail view, on an enlarged scale, of the first two tube type sections of the upper blast head of FIG. 1.

The blast heads 20 and 21 are made up of oppositely disposed sections 22, each of which comprises an elongated air chamber 43, opening into a plenum chamber 44. The chamber 43 is secured at its opposite ends to the plenum chamber by bolt and nut assemblies 45 and is closed by a plate 46. With the first few sections 22, which are of the tube type, the closure plate 46 is perforated and is provided with tubes 47 extending outwardly therefrom and which preferably vary in length from end to end of the section or from one side of the blast head to the other to fit the curvature of the bent glass sheet (FIG. 3). With this construction it is possible to change from tempering convexly bent glass sheets to concavely bent ones by simply changing either the individual sections 22, or their closure plates 46, from the top to the bottom blast head and from the bottom to the top one; and, to facilitate rapid changes of the individual sections, the bolt and nut assemblies by which the air chamber of each section is secured to its respective plenum chamber 44 is pivoted to the plenum chamber as at 48 in FIG. 5 while the section 22 is provided with a slotted extension 49 (FIGS. 5 and 6) into and out of which the bolt of the assembly 45 can be swung for ready removal or placement.

Another important feature of the present invention insures movement of the thin, bent glass sheets smoothly into the chilling area and between the high pressure jets of air being directed into their path from the opposed blast heads 20 and 21. This is accomplished by angling the tubes 47 in the first sections thereof (FIGS. 1 and 5) in the direction of movement of the glass, so that the jets of air therefrom act to direct the glass and literally suck the sheets into the relatively narrow slot-like opening between the upper and lower blast heads.

To this end, the closure plates 46 of the upper and lower first blast head sections 22 are connected to their respective air chambers 43 by brackets 50 and 51 and a diaphragm 52. This permits movement of the closure plate about a pivot 53 carried by the bracket 50, to adjust the tubes 47 to the desired angle, and securing them at that angle by a set screw 54 passing through a slot 55 in the bracket 51.

After the first few blast head sections, it is no longer necessary to employ contoured sections. Flat ones can be used, and we have discovered that just as good tempering effects can be had by reversing the closure plates 46 to extend the tubes 47 into instead of outwardly from the air chambers 43. At the same time this presents a flat, trap free surface to the glass sheets, which facilitates the removal of broken glass from the blast heads in a potentially high breakage area.

Figure 7:
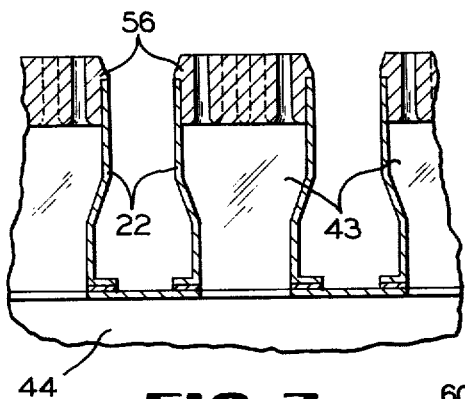
FIG. 7 is a transverse sectional view taken substantially along the line 7—7 in FIG. 6.

The same thing can be accomplished by providing a substantially thicker closure plate 56, and drilling it with holes in a selected pattern and counterbored at their air chamber ends, as shown in FIG. 7.

Figure 8:
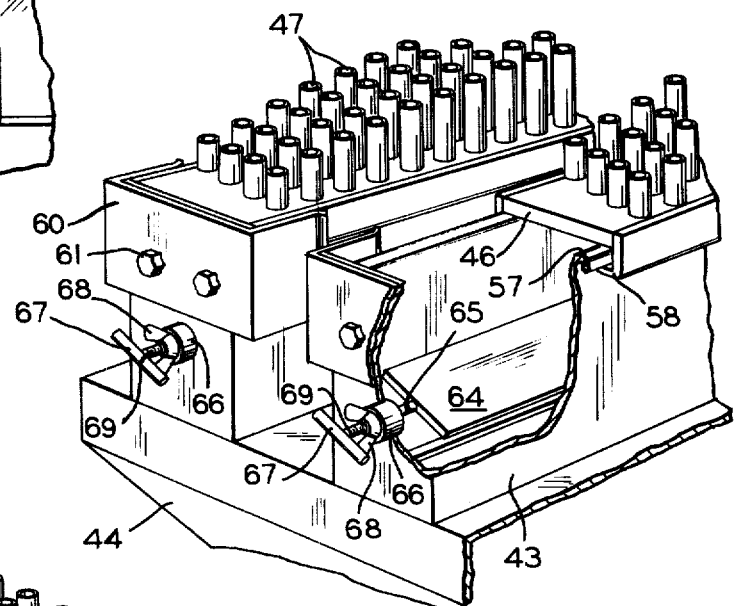
FIGS. 8 and 9 are perspective views from opposite ends of two tube type blast head sections of a modified form.
Figure 9:
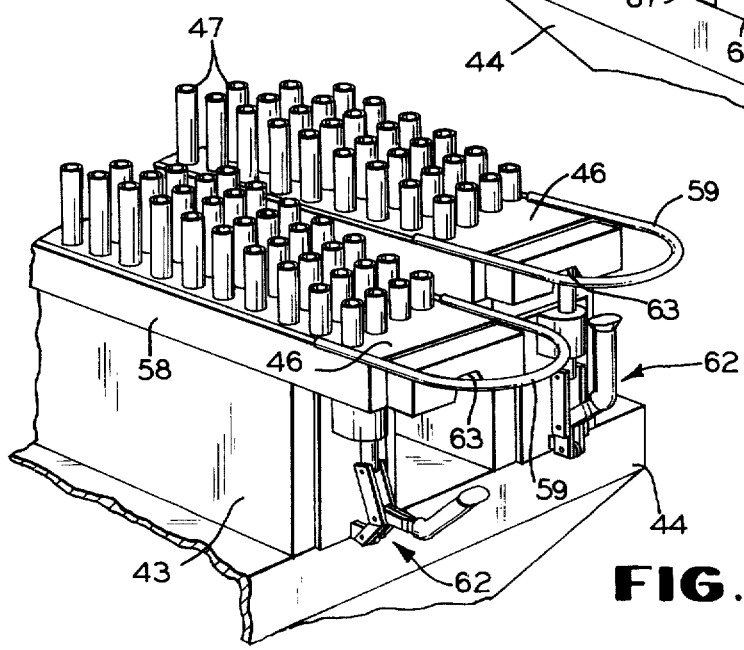

A somewhat modified form of blast head section is illustrated in FIGS. 8 and 9, which permits a more rapid exchange of closure plates, and so lends itself to this aspect of the invention. In the construction shown, the air chambers 43 are more or less permanently connected to their plenum chamber 44 and are provided along their longitudinal outer edges with flanged portions 57. The closure plates 46 therefore are provided with similar but reversed flanges 58 along their longitudinal edges which are adapted for sliding interengagement with the flanges 57.

Such an arrangement simplifies the placement and removal of the closure plates by permitting them to be slid into or out of position on the air chambers 43 upon interengagement of the flanges 57 and 58. For this purpose, the flanges 57 on the air chambers 43 are open at one end (FIG. 9), and a handle 59 is provided at one end of each closure plate; while the opposite ends of the flanges 57 are closed (FIG. 8) by angle plates 60 that fit around three sides of the air chambers 43 and are secured thereto by the bolts 61.

Quick acting, toggle type latch means 62 (FIG. 9) are mounted on the end of each of the air chambers 43 for engagement with grooves 63 in the underside of the handle end of the closure plates 46 to make possible the rapid and secure locking of the closure plates into and their easy unlocking from their closed position. FIGS. 8 and 9 depict the mounting of projecting tube type closure plates but it will be apparent that closure plates of different design, such as shown at 56 in FIG. 7 for example, can be adapted to be mounted, retained and removed from the air chambers 43 in the same way. Similarly, air dampers 64 may be pivotally mounted within the air chambers 43 for either type of closure plate on rods 65, journaled in bearings 66 in the end walls of the chambers, for adjustment by means of handles 67; and can be locked in adjusted position by wing nuts 68 on the threaded ends 69 of the rods 65.

In a typical installation, glass sheets 15 were heated to bending temperature and prebent toward the required bent curvature on rolls of the series 16 in a conventional type heating furnace 12 (FIG. 1); and the bending area 13 was equipped to bend a succession of the heated, prebent sheets from the furnace 12 on an outline mold 19 by the "I-G" (Inertia-Gravity) method disclosed in U.S. Pat. No. 3,476,540. More specifically, glass sheets 15 that had been heated to bending temperature in the furnace 12 were moved into bending position over the mold 19 (dotted lines in FIG. 1) on rolls of the series 16 and 17. Immediately thereafter the mold 19 was rapidly raised, by piston rod 70 of air cylinder 71, at a speed sufficient to cause the glass sheet to bend by the combined forces of inertia and gravity into full contact with the shaping surface of the mold, whereupon the mold was quickly lowered to return the bent sheet to the rolls 17.

The rolls 17 within the ring of the mold 19 and between the ring and the blast heads 20 and 21 were so-called contoured rolls, on 1 inch diameter shafts, covered with fiber glass sleeves, and having a No. 8½ sweep over a 60 inch length. To explain, "sweep" is a term used by automotive engineers and stylists to designate a curvature, or deviation, from a straight 60 inch line. Thus, a No. 1 sweep is a ⅛ inch rise measured at the centerline of a constant true curve, and a No. ½ sweep is a 1/16 inch rise. Consequently, a No. 8½ sweep designates a 1-1/16 inch rise over 60 inches or, specifically applied, indicates that 1-1/16 inches has been added to each side of the 1 inch shaft, to give a 3⅛ inch diameter at the center and a uniform curvature down to 1 inch diameter at the 60 inch dimension; and this was the exact curvature of the top and bottom edges of the checking fixture employed. In the area of their use, contoured rolls drive the glass sheets at the speed of their major diameters, so that the speed at which these rolls are driven requires compensation.

Moreover it was found that such contoured rolls could not be successfully used in the tempering area 14 because their relatively large diameter (3⅛ inches) masked off too much of the glass sheets from the chilling air being directed toward them from the blast heads 20 and 21 and also required the sections 22 of the lower blast head to be at least 3¼ inches below or away from the glass sheets. Accordingly the rolls employed for the series 18 were of the spring type already described and illustrated in FIGS. 3 and 4. These rolls not only fitted into the curvature of the glass but permitted a glass to blast head dimension well within the 1½ inches which was found to be the maximum effective distance, and their 1⅛inch outside diameter permitted the sections 22 in the lower blast head 21 to be located in closer proximity to one another.

In the preferred construction the spring type rolls of the series 18 employ an inside screw as the stub 23 and this is provided with a head 73, to keep it in place, and that is slotted as at 74 to facilitate assembly. The purpose of the screw is to allow the spring to be securely fastened by an external safety set screw 75 without distorting the circular shape of the spring, which would prevent it from running true. The use of wire larger than 5/32 inch in diameter in the spring has several advantages. The roll will have less tendency to whip or swing as it is driven at moderately high speeds, for example around 300 RPM; and, when the wire is wound under compression, it will carry a load greater than required in either preforming or carrying glass as in the present invention. Also the spring roll can be used in an arch above as well as below the horizontal plane. The capabilities of such rolls are dependent on the overall length of the spring and the radius of curvature. By way of example, a 60 inch spring roll of the construction here described, and wound of ⅜ inch diameter wire under a compression of 100 pounds, will support over 100 pounds per roll when arched above the horizontal plane.

The blast heads 20 and 21 each comprised 10 four inch wide sections 22 located on 5½ inch centers, for a total of 20 sections. Only the first five sections top and bottom were contoured (FIGS. 3, 8 and 9), and these were of the tube type, with the remainder being flat (FIG. 1). The tubes in the first two sections 22, both top and bottom, were angled away from the bending area at an angle of approximately 2½°, which was found to give the best results.

Figure 6:
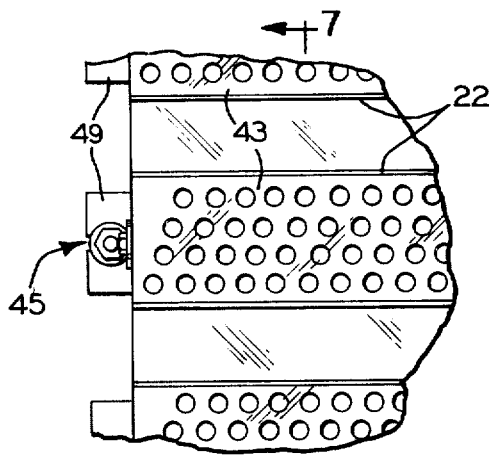
FIG. 6 is a fragmentary plan view of some of the subsequent, plate type blast head sections.

The flat sections 22 of the blast heads 20 and 21 were of the character shown in FIGS. 6 and 7, with the closure plates 56 being made up of solid blocks of aluminum 2 inches thick, drilled to a selected pattern and with the entrance ends of the resulting orifices counterbored to a formula calculated to provide a smooth entrance orifice having a flow efficiency of approximately 0.99. In addition blocks 72 were located between the sections 22 of the top blast head 20 to counteract the interference with the air flow from the conveyor rolls 18 between the lower blast head sections.

In connection with the rolls in the series 16 it may be desirable to have a portable section where as much as 100 inches of run may be provided ahead of the bending area in which to preform the glass before actual bending either by IG or by a pressure bending technique such as shown in U.S. Pat. No. 3,454,389. This prebending area can also have provision for applying heat locally to extreme bending areas of the glass and/or for cooling or using air as a thermal differential assist to the preforming technique.

In actual trials prebends of as much as 3½ inches before pressing have been achieved and, by employing preforming in combination with pressure bending a final 6 inch depth of bend can be attained without objectionable marking of the glass.

Accordingly, it is to be understood that the forms of the invention herewith shown and described are to be taken as illustrative embodiments only of the same, and that various changes in the shape, size and arrangement of parts, as well as various procedural changes, may be resorted to without departing from the spirit of the invention as defined in the following claims.

We claim:

1. In a method of bending and tempering glass in which a succession of flat glass sheets are supported in substantially horizontal position and moved along a predetermined path through a heating area in which the glass is heated to substantially its point of softening, a bending area in which the heated sheets are shaped to a final desired contour, and a chilling area in which streams of cooling fluid are directed against opposite surfaces of the heated and bent glass sheets to temper them; the improvements which comprise providing a passageway for bent glass sheets between said bending and said chilling areas, opening said passageway during movement of heated and bent sheets from the former to the latter area, and maintaining said passageway closed at all other times; and angling certain of said streams of cooling fluid that are at the entrance end of said chilling area by directing the same through tubes toward and in the direction of travel of said glass sheets, and directing subsequent streams of cooling fluid from openings in trap-free surfaces toward and against the surfaces of said sheets.

2. A method as defined in claim 1, in which said heated sheets are supported for movement from said heating area into said bending area on a series of rolls the supporting surfaces of which are of progressively increasing transverse curvature to preform said sheets toward said final desired contour.

3. A method of bending glass in which a succession of flat glass sheets are supported in substantially horizontal position and moved along a predetermined path first through a heating area in which the glass is heated to bending temperature, next over a series of rolls the supporting surfaces of which are of progressively increasing transverse curvature to prebend said heated sheets, and then into a bending area in which said heated and prebent sheets are shaped to a final desired curvature.

4. A method as defined in claim 3, in which said sheets are shaped to said final desired curvature on a bending mold, and are supported in said substantially horizontal position after said shaping on a series of spaced rolls that fit said final desired sheet contour.

5. In apparatus for bending and tempering glass comprising means for supporting a succession of flat glass sheets in substantially horizontal position and for moving the same along a predetermined path through a heating area which includes means for heating the glass to substantially its point of softening, a bending area which includes means for shaping heated sheets to a desired final contour, and a chilling area which includes upper and lower blast heads for directing cooling fluid against opposite surfaces of heated and bent sheets moving along said path; the improvement in which said blast heads include means adjacent the entrance end of said chilling area comprising a plurality of tubes that vary in length from side to side of said path in substantial conformance with the transverse curvature of the glass sheets being tempered for directing said fluid in a plurality of streams angled toward a surface and in the direction of travel of said heated and bent sheets to direct and draw said sheets into the space between said upper and lower blast heads.

6. Apparatus as defined in claim 5 in which said blast heads comprise a series of plenum chambers, apertured plates slidable onto and off of said plenum chambers, and means for securing said plates in position on said chambers.

7. Apparatus as claimed in claim 5 in which said blastheads further include apertured plate means beyond said tubes which provide trap-free means for directing streams of cooling fluid toward said heated and bent sheets.

8. In apparatus for bending and tempering glass comprising means for supporting a succession of flat glass sheets in substantially horizontal position and for moving the same along a predetermined path through a heating area which includes means for heating the glass to substantially its point of softening, a bending area which includes means for shaping heated sheets to a desired final contour, and a chilling area which includes means for directing cooling fluid against opposite surfaces of heated and bent sheets moving along said path; the improvement which includes means associated with the exit end of said heating area and the entrance end of said bending area for prebending said heated glass sheets toward a final desired contour.

9. Apparatus as claimed in claim 8 in which said prebending means is a series of rolls the supporting surfaces of which are of progressively increasing transverse curvature.

10. Apparatus as claimed in claim 9, in which a series of spaced rolls shaped to fit said final desired sheet contour are provided in and beyond said bending area for supporting said glass sheets in and for movement out of said bending area.

11. Apparatus as defined in claim 10, in which at least some of the rolls in said series are spring type rolls arched to provide curved supporting surfaces thereon.

* * * * *